(12) United States Patent
Stava

(10) Patent No.: US 7,968,822 B2
(45) Date of Patent: Jun. 28, 2011

(54) ARC WELDING SYSTEM

(75) Inventor: Elliott K. Stava, Sagamore Hills, OH (US)

(73) Assignee: Lincoln Global, Inc., Monterey, CA (US)

( * ) Notice: Subject to any disclaimer, the term of this patent is extended or adjusted under 35 U.S.C. 154(b) by 1295 days.

(21) Appl. No.: 11/090,576

(22) Filed: Mar. 28, 2005

(65) Prior Publication Data

US 2006/0213891 A1    Sep. 28, 2006

(51) Int. Cl.
*B23K 9/10* (2006.01)
*H05B 37/02* (2006.01)
*G05F 5/00* (2006.01)
*H02M 3/335* (2006.01)

(52) U.S. Cl. ............. 219/130.5; 219/130.1; 219/130.21; 315/224; 315/294; 323/207; 323/271; 323/272; 363/21.02; 363/21.14

(58) Field of Classification Search .............. 219/121.11, 219/130.1, 130.21, 130.5, 130.51, 136, 130.33, 219/130.01, 130.4, 137.2, 137.7, 137.71; 315/294, 224, 307, 312
See application file for complete search history.

(56) References Cited

U.S. PATENT DOCUMENTS

| | | | |
|---|---|---|---|
| 4,717,807 A | 1/1988 | Parks | |
| 5,003,154 A | 3/1991 | Parks | |
| 5,148,001 A | 9/1992 | Stava | |
| 5,406,051 A * | 4/1995 | Lai | 219/130.1 |
| 5,786,992 A * | 7/1998 | Vinciarelli et al. | 363/89 |
| 6,160,241 A | 12/2000 | Stava | |
| 6,215,100 B1 * | 4/2001 | Stava | 219/130.51 |
| 6,291,798 B1 | 9/2001 | Stava | |
| 6,343,026 B1 * | 1/2002 | Perry | 363/65 |
| 6,365,874 B1 | 4/2002 | Stava | |
| 6,441,342 B1 * | 8/2002 | Hsu | 219/130.01 |
| 6,472,634 B1 | 10/2002 | Houston | |
| 6,501,049 B2 | 12/2002 | Stava | |
| 6,504,132 B1 * | 1/2003 | Church | 219/130.1 |
| 6,600,134 B2 | 7/2003 | Stava | |
| 6,847,008 B2 | 1/2005 | Myers | |

* cited by examiner

*Primary Examiner* — Henry Yuen
*Assistant Examiner* — Ket D Dang
(74) *Attorney, Agent, or Firm* — Hahn Loeser & Parks LLP

(57) ABSTRACT

An electric arc welding system including a power lead for providing welding current between an advancing welding wire and a workpiece, a short circuit sensor having a short circuit output signal when the electrode is shorted with the workpiece and a premonition sensor having a fuse output signal when a short circuit is about to break. This welding system has at least two power source modules, each with a common isolated DC input and an output connected to the power lead with each of the modules controlled to perform a short circuit arc welding process. The individual module comprises a regulated DC to DC converter having a DC output signal with a waveform controlled by a waveform signal from a controller and an output switch receiving the DC output signal and in series with the power lead where the output switch is opened by a gate signal to reduce the welding current in the power lead.

59 Claims, 2 Drawing Sheets

ARC WELDING SYSTEM

The present invention relates to the art of electric arc welding and more particularly to an arc welding system utilizing a plurality of power modules for driving a single welding operation.

INCORPORATION BY REFERENCE

In the electric arc welding industry, it is known to drive a single welding operation by a series of power source modules preferably connected in parallel, but sometimes connected in series. The Lincoln Electric Company of Cleveland, Ohio is a pioneer in this technology and has several patents such as Stava U.S. Pat. No. 6,291,798; Stava U.S. Pat. No. 6,365,874; Houston U.S. Pat. No. 6,472,634; and, Myers U.S. Pat. No. 6,847,008. These patents are incorporated by reference herein to illustrate the general technology forming s background concept related to the present invention. The Lincoln Electric Company is also the pioneer of a welding process utilizing controlled arc and short circuit conditions in a single cycle wherein the short circuit condition is sensed by a detector and the arc condition is determined by a detector. This proprietary welding process is disclosed in several patents including Parks U.S. Pat. No. 4,717,807; Parks U.S. Pat. No. 5,003,154; Stava U.S. Pat. No. 5,148,001; Stava U.S. Pat. No. 6,160,241; and, Stava U.S. Pat. No. 6,501,049. These patents relating to s proprietary short circuit type welding process to which the present invention is particularly directed are incorporated by reference herein as further background information. All of these patents relate to certain concepts employed in the present invention and are incorporated into this application so that the technology is disclosed so there is no necessity for duplicating such background technology.

BACKGROUND OF INVENTION

In open root welding of pipe lines and other delicate electric arc welding operations it has proved beneficial to use a proprietary arc welding process having an arc condition and a short circuit condition in each of a plurality of low frequency welding cycles, such as less than about 200 cycles per second. The power supplied to the welding electrode in such process is controlled according to a detected short circuit and the anticipation of the metal breaking during the short circuit condition. This short circuit welding process accurately controls heat and drastically reduces spatter. It is referred to in the welding industry as the proprietary STT welding process of The Lincoln Electric Company and is performed by a welder having a power source wherein an output power switch is open at initiation of the short circuit condition and opened to subsequently initiate the arc condition after a short circuit. Such welder is normally manufactured with a maximum capacity of approximately 300-500 amperes. Consequently, the welder has a limited deposition rate. There is a need for a welding system to perform the proprietary welding process, but having a substantially greater maximum current rating. Heretofore, this increased current capacity was obtainable only by designing a special power source and output switch machine. The switch had to have a drastically higher current capacity and the remainder of the power source had to have a substantially greater current generating capacity. These requirements substantially increased the cost, which cost was not justified due to substantially less applications. The concept of paralleling power sources was not practical because each of the power sources would produce its own waveform, which resulted in an unacceptable welding result. Thus, there is a need for an inexpensive welding system to perform the proprietary welding process using a short circuit condition and an arc condition with a current capacity substantially greater than 300-500 amperes.

THE INVENTION

The invention involves an electric arc welding system for performing an arc welding process having an arc condition and a short circuit condition in successive welding cycles. The power supplied to a welding electrode is controlled according to a detected short circuit and an anticipated metal breaking fuse condition. In this process, a controlled boost pulse is provided during the arc condition to establish an arc length and to form molten metal. The boost pulse is followed by a controlled current to form the molten metal ball on the end of an advancing electrode so that the ball is subsequently transferred by surface tension. During the surface transfer, the molten metal of the ball necks down and is separated by a "fuse" accelerated through an electromagnetic pinch action. At the start of the metal transfer and at the end of the metal transfer an output power switch in the welder reduces the arc current to control the transfer action and reduce spatter. This type of welding system has in the past been limited to about 300-500 amperes. In accordance with the present invention, the system can perform the described short circuit welding process with a current capacity exceeding 600 amperes. Indeed, the welding current capability can be well over 800-1000 amperes. The increased current capacity does not decrease the efficiency of the metal transfer, nor does it increase the spatter when the metal transfer is finalized by the necking action that separates the molten metal ball from the electrode.

In accordance with the present invention, the electric arc welding system includes a power lead for providing welding circuit between an advancing welding wire and a workpiece. A short circuit sensor creates a short circuit output signal when the electrode is shorted to the workpiece. There is also a premonition having a "fuse" output signal when a short circuit is about to end to shift between the short circuit condition and the arc condition. This welding system is improved by including at least two power source modules each with a common isolated DC input and an output connected to the power lead of the system. Each of these modules is controlled to perform the short welding process as described. To coordinate the operation of each module, each module comprises a regulated DC to DC converter having a DC output signal with a waveform controlled by a waveform signal from a controller and a power output switch that receives the DC output signal from the power source and is in series with the output power lead. The output switch of each module is opened by a gate signal to the module to reduce the welding current in the power lead. A common controller is used for all modules. The controller is either digital or analog and has a first input for the short circuit output signal and a second input for the fuse output signal. The common controller generates an output for creating the gate signal to reduce the welding current upon the receipt of a signal in either of the first or second inputs to the controller. A circuit uses the inputs to reduce the current for a set short time after a short is detected. Then the circuit reduces the current for a set time when the short circuit is about to break. This gate signal from the control circuit of the controller is directed to each of the modules at the same time to initiate the metal transfer short circuit condition and to terminate the transfer condition. The termination of the transfer is followed by the arc condition having an initial power boost current. Thus, the actual welding process is performed by a plurality of modules that are coordinated by actual sensing of the welding process and creating signals common to all modules. Thus, the modules operate in unison so the 300-500 ampere limitation of each of the modules is multiplied by the number of modules in the system. In this manner, the welding process is performed with the current from a plurality of modules between two and any number. Each module receives signals that control the operation of the modules in unison.

In accordance with another aspect of the present invention, the waveform signal is created by a waveform generator having a state table with a given waveform during both the arc condition and the short circuit condition of the welding process. The premonition sensor is a dv/dt detector with a threshold value to create the "fuse" output signal that is used in unison by all of the power supply modules. In practice, the waveform signal is formed by a pulse width modulator. The preferred waveform during the metal transfer operation involves a varied rate of current increase. Indeed, in practice one rate is used at the start of the transfer. Then a second rate is outputted by the waveform.

In accordance with the preferred embodiment of the present invention, the regulated converter of each module is a chopper and the input to the modules is a DC signal created by an unregulated, isolated DC converter. In the past, the output stage of the power source for the welder is driven by a regulated input stage. In such system, the output stage is regulated by the parameters of the welding process. Thus, in the past, both stages are regulated. In accordance with the preferred embodiment of this invention, the output stage is regulated and the input to the output stage is not regulated. Of course, such an arrangement would include a further upstream pre-regulator which concept is not part of the present invention.

Still a further aspect of the present invention, there is provided a method for electric arc welding. This method comprises providing a plurality of power source modules each generating an essentially identical waveform controlled by a common waveform signal from a controller, connecting the modules between a DC input to provide an output to a single welding operation including an electrode and workpiece, sensing a short circuit between the electrode and workpiece to create a short circuit signal and starting the identical waveform of each module upon creation of the short circuit signal. In practice there is a set time delay after a detected short circuit. This method is used to perform a welding process that requires an output switch that is opened upon creation of the short circuit signal. Furthermore, in the preferred embodiment the input signal is from an unregulated isolated DC to DC converter.

The primary object of the present invention is the provision of a welding system to perform a welding process having an arc condition and a short circuit condition where the power supply to a welding electrode is controlled according to a detected short circuit and an anticipated breaking fuse condition. This system utilizes a plurality of modules so that the output current capacity can be increased merely by adding standardized low current modules. These standardized modules are rated to perform the normal low current method.

A further object of the present invention is the provision of a welding system as defined above, which welding system coordinates several individual power source modules by common signals from a single controller operated in accordance with real time parameters of the welding process.

These and other objects and advantages will become apparent from the following description taken together with the accompanying drawings.

PREFERRED EMBODIMENT

Figure 1:
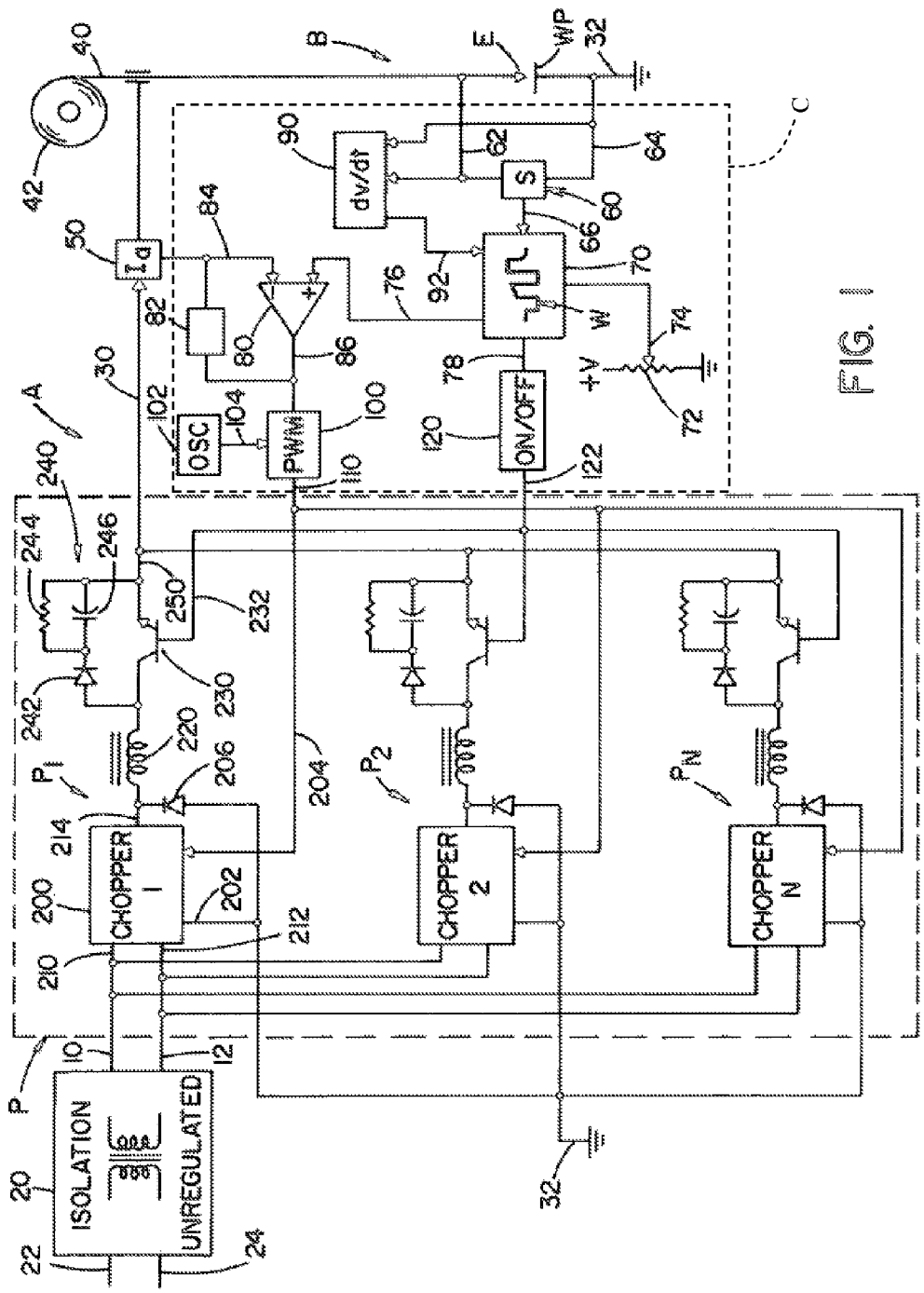
FIG. 1 is a schematic wiring diagram of the preferred embodiment of the present invention.
Figure 1A:
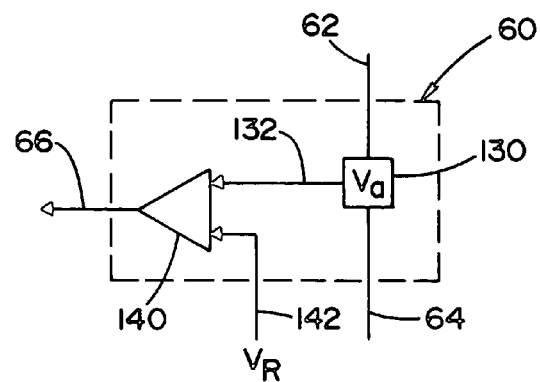
FIG. 1A is a partial analog diagram of the short circuit detecting network used in the embodiment of the invention illustrated in FIG. 1; and, FIG. 2 is a partial wiring diagram illustrating a further feature of the present invention.

The present invention is directed to welding system A for performing a welding process having an arc condition and a short circuit condition in each of a plurality of low frequency welding cycles, generally less than 200 cps. In this welding process, the power supplied to a welding electrode is controlled according to a detected short circuit and an anticipated metal breaking fuse condition. A controlled boost pulse is provided during the arc condition to establish an arc length and to form a molten metal ball, with the boost pulse being followed by a controlled background current to create a ball that is transferred to the workpiece by a surface tension phenomenon. Such process is well known in the welding industry and is described in several patents owned by The Lincoln Electric Company of Cleveland, Ohio. A few of such patents are Parks U.S. Pat. No. 4,717,807; Parks U.S. Pat. No. 5,003,154; Stava U.S. Pat. No. 5,148,001; Stava U.S. Pat. No. 6,160,241; and, Stava U.S. Pat. No. 6,501,049. As described in FIG. 1, system A includes power source P with input DC signal leads 10, 12. In the preferred embodiment of the invention, the DC signal on these leads is provided by an unregulated DC to DC converter 20 which receives a regulated input on leads 22, 24 from a preregulator. A preregulator normally is a power factor correcting buck converter. Other sources of the DC signal on leads 10, 12 are used when practicing the short circuit welding process to which the present invention is directed. Power source P has an output power lead 30 and a common return or ground lead 32. In practicing the invention, power source P performs the aforementioned welding process at a standard welding station B wherein electrode E, in the form of an advancing wire 40 from supply reel 42, is moved toward workpiece WP. Thus, the welding process is performed between the end of electrode E and workpiece WP. In accordance with standard architecture, an arc current sensor 50, normally in the form of a shunt, is provided to create a voltage signal representing the arc current of the welding process. When performing the welding process to which the invention is directed, a short circuit detector 60, best shown in FIG. 1A, is controlled by the voltage across sensed leads 62, 64. Detector 60 provides a signal on output 66 when the voltage between electrode E and workpiece WP is below a threshold value, indicating a short circuit condition in the welding process. Single controller C causes power source P to perform the desired welding process. Such controller is illustrated schematically as analog components; however, in practice the controller functions are digital and performed by a microprocessor or other digital signal processor. Controller C includes a wave shaper 70 to generate a wave shape W at power lead 30 in accordance with a waveform or wave shape output signal on line 76. The signal shape is from a look up table or other source of desired waveforms or waveform portions. The signal on line 76 can be trimmed in accordance with standard practice by a potentiometer 72 with an arm 74 to define a set point for the waveform generator or wave shaper 70. The voltage on arm 74 is generally related to the magnitude of the arc current being used in the welding process. An output waveform signal for controlling the shape of the waveform or waveform portions during the welding process is directed by line 76 to amplifier 80 having feedback network 82 and a second input 84. Consequently, the signal on output 86 forces the current at lead 30 to track the desired wave shape W set in wave shaper 70. This is standard technology in the welding industry to perform the welding process to which the invention is particularly adapted. The signal on line 86 controls pulse width modulator 100 so the pulses on output line 110 has a frequency of greater than about 20 kHz as determined by oscillator 102 for driving pulse width modulator 100 through the high frequency signal on line 104. Thus, the output pulses on line 110 cause the arc current to track the wave shape W in accordance with standard practice, which may be different for the short circuit condition and the arc condition. To determine when the molten metal ball is ready to and detach from electrode E after there has been a short circuit, premonition circuit 90 monitors the voltage across leads 62, 64. Circuit 90 provides an output signal on line 92 when dv/dt of the welding process reaches a predetermined threshold level indicating an imminent break or "fuse" of the short circuit transferred molten metal.

In accordance with standard practice, controller C provides a signal in line 78 when there is a signal in line 66 indicating a short circuit and when there is a subsequent signal in line 92 to indicate that the short circuit is ready to break. Circuit 120 reads the information on line 78 and its sequencing to create a signal in line 122 when the power switch of power supply P is to be opened for a drastic reduction in current based upon the signals from circuit 60 and 90. Circuit 120 produces a signal in line 122 for operating the power switch of power source P to produce the desired welding process. To detect the actual short circuit condition at the start of the short circuit portion of the cycle, the signal on line 78 is created by the signal on line 66. The signal stays on during a short. An analog representation of detector 60 is illustrated in FIG. 1A wherein the arc voltage is sensed by detector 130 having an output lead 132 to direct a voltage representative of the arc voltage to one input of comparator 140. The other input 142 is the reference signal representative of a reference voltage, such as about 6.0 volts DC. Thus, when the voltage across the welding station is decreased below a value such as 6.0 volts DC, a signal is generated in line 66. This initiates the short circuit portion of waveform W. The end of the short circuit condition is sensed by a signal in line 90 to again actuate a signal on output lead 122. The signal on line 92 after a signal on line 66 decreases the arc current rapidly by again opening the power switch of power source P. Thus, a signal on line 122 occurs when there is a short and thereafter when there is an impending break of the short. This is standard technology in the arc welding industry.

Power supply P includes power lead 30 and return or ground lead 32 and a waveform signal on line 110. A signal to reduce the arc current in accordance with the process being performed is directed to power source P by line 122. In accordance with the invention, power source P includes a plurality of identical modules $P_1$, $P_2$ and $P_N$. The number of identical modules can vary; however, they are not synchronized in timing but are operated in unison based upon the signals on lines 110, 122. The waveform profiles are controlled by the signal on line 110 and are implemented by the signal on line 122. Consequently, all power modules perform the same waveform or waveform portions and the same reduction of current upon occurrence of a short circuit and upon occurrence of the end of the short circuit portion of the cycle. Each module is identical; therefore, module $P_1$ will be described in detail. This description applies equally to the other modules. Module $P_1$ includes a power source 200, shown as a down chopper or buck converter, having a ground lead 202 and a waveform profile signal from line 204 connected to output line 110 of pulse width modulator 100. Freewheeling diode 206 is connected with ground lead 202 and ultimately to the common return or ground lead 32. Power source 200 includes a DC input signal on lines 210, 212 and an output DC signal on line 214. Chopper or power source 200 drives a switching network through choke 220, which switching network controls current on line 30 and includes a power switch 230 in the form of a Darlington switch operated in accordance with the logic on gate 232 from line 122 of circuit 120. Switch 230 has a parallel snubber circuit 240 including diode 242 and resistor 244 in series with output lead 250 connected directly to power lead 30. Capacitor 246 is connected in parallel with resistor 244 for controlling the voltage across resistor 244 in accordance with standard practice. The power source for performing the welding process to which the present invention is directed includes a single circuit as described in connection with module $P_1$. In practice, this type of power source has an output current capacity of generally 300-500 amperes. Consequently, the welding process was limited to lower currents. In accordance with the invention, one or more additional modules are connected in parallel to operate in unison with power source $P_1$ to increase the current capacity by multiples of the existing current capacity. Thus, by using a standard module with shared leads and control signals, system A can have drastically increased current capacities without requiring a specifically designed power source for diverse high current applications. In this manner, current available to drive the welding process between electrode E and workpiece WP can be increased without designing a high current power source. Such specially designed high current sources have not been added to the product line of electric arc welder manufacturers because of the low volume demand compared to the increased development and inventory costs. Thus, the present invention allows the implementation of the preferred welding process with substantially higher maximum current capabilities without increasing the cost of already designed power sources. In practice, more than two identical power sources are used; however, in accordance with the present invention system A could employ only two power sources $P_1$ and $P_2$.

Figure 2:
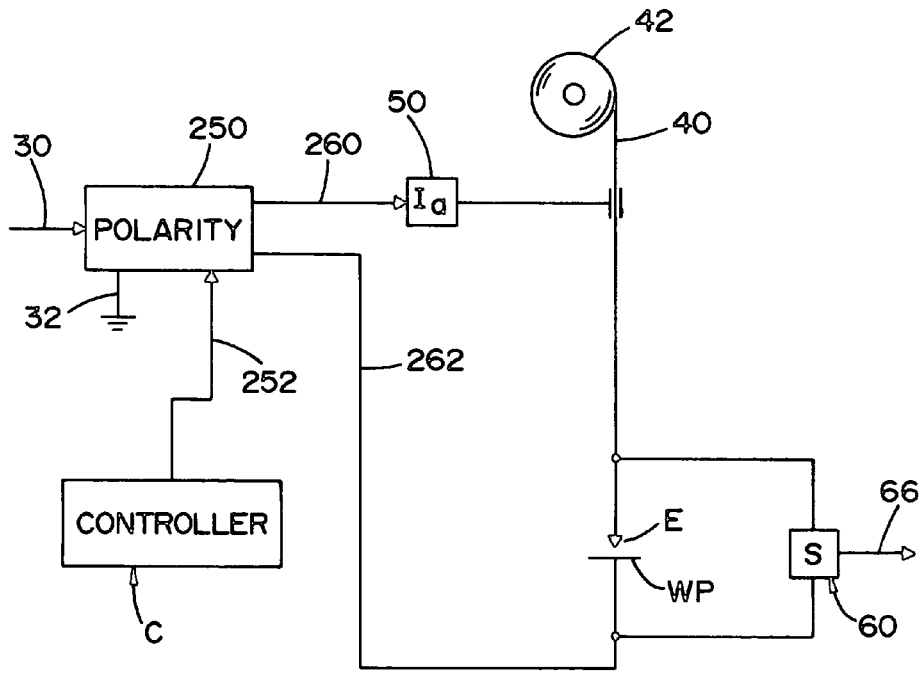

As so far described, the invention relates to a DC waveform with a short circuit section and an arc section. However, an AC implementation can be made, as illustrated in FIG. 2. The power lead 30 and return lead 32 are connected to a polarity switch 250 so a polarity signal on line 252 created by controller C reverses the polarity of one section of the waveform, both sections of the waveform or the whole waveform. Indeed, a small portion of one section of the waveform can be performed at an opposite polarity than the remainder of the section and the remainder of the other section. The waveform is created on output lines 260, 262 connected to the welding operation disclosed in FIG. 1. The polarity is reversed at selected times determined by the logic on line 252.

Having thus defined the invention, the following is claimed:

1. An electric arc welding system comprising:
   a power lead for providing welding current between an advancing welding wire of a welding electrode and a workpiece, said welding current supplied to said power lead being controlled according to a detected short circuit condition and an anticipated metal breaking fuse condition;
   a short circuit sensor for detecting said short circuit condition, said short circuit sensor having a short circuit output signal when said welding electrode is shorted with said workpiece creating a short circuit;

a premonition sensor for anticipating said metal breaking fuse condition, said premonition sensor having a fuse output signal when said short circuit is about to break;

a controller having a first input comprising said short circuit output signal and a second input comprising said fuse output signal, said controller having a switch control output for creating a common gate signal upon initial receipt of said short circuit output signal and said fuse output signal to said controller; and at least two parallel power source modules with a common unregulated and unswitchable isolated DC input and an output connected to said power lead, each of said modules controlled in unison with each other in a same way by a same common waveform signal and said same common gate signal to perform a short circuit arc welding process having an arc condition and a short circuit condition in each of a plurality of welding cycles, each of said modules in series with said power lead and comprising:

a regulated DC to DC converter having a DC output signal with a waveform controlled by said common waveform signal from said controller, and an output switch receiving said DC output signal, said output switch being opened by said common gate signal to reduce said welding current in said power lead.

2. An electric arc welding system as defined in claim 1 wherein said waveform signal is created by a waveform generator loaded with a given waveform during both said arc condition and said short circuit condition.

3. An electric arc system as defined in claim 1 wherein said premonition sensor is a dv/dt detector with a threshold value to create said fuse output signal.

4. An electric arc welding system as defined in claim 3 wherein said waveform signal is from a pulse width modulator.

5. An electric arc welding system as defined in claim 2 wherein said waveform signal is from a pulse width modulator.

6. An electric arc welding system as defined in claim 1 wherein said waveform signal is from a pulse width modulator.

7. An electric arc welding system as defined in claim 6 wherein said regulated DC to DC converter is a chopper.

8. An electric arc welding system as defined in claim 5 wherein said regulated DC to DC converter is a chopper.

9. An electric arc welding system as defined in claim 4 wherein said regulated DC to DC converter is a chopper.

10. An electric arc welding system as defined in claim 3 wherein said regulated DC to DC converter is a chopper.

11. An electric arc welding system as defined in claim 2 wherein said regulated DC to DC converter is a chopper.

12. An electric arc welding system as defined in claim 1 wherein said regulated DC to DC converter is a chopper.

13. An electric arc welding system as defined in claim 12 wherein said isolated DC input signal is created by an unregulated, isolation DC to DC converter.

14. An electric arc welding system as defined in claim 11 wherein said isolated DC input signal is created by an unregulated, isolation DC to DC converter.

15. An electric arc welding system as defined in claim 10 wherein said isolated DC input signal is created by an unregulated, isolation DC to DC converter.

16. An electric arc welding system as defined in claim 9 wherein said isolated DC input signal is created by an unregulated, isolation DC to DC converter.

17. An electric arc welding system as defined in claim 8 wherein said isolated DC input signal is created by an unregulated, isolation DC to DC converter.

18. An electric arc welding system as defined in claim 7 wherein said isolated DC input signal is created by an unregulated, isolation DC to DC converter.

19. An electric arc welding system as defined in claim 6 wherein said isolated DC input signal is created by an unregulated, isolation DC to DC converter.

20. An electric arc welding system as defined in claim 5 wherein said isolated DC input signal is created by an unregulated, isolation DC to DC converter.

21. An electric arc welding system as defined in claim 4 wherein said isolated DC input signal is created by an unregulated, isolation DC to DC converter.

22. An electric arc welding system as defined in claim 3 wherein said isolated DC input signal is created by an unregulated, isolation DC to DC converter.

23. An electric arc welding system as defined in claim 2 wherein said isolated DC input signal is created by an unregulated, isolation DC to DC converter.

24. An electric arc welding system as defined in claim 1 wherein said isolated DC input signal is created by an unregulated, isolation DC to DC converter.

25. An electric arc welding system as defined in claim 24 wherein said system includes more than two modules.

26. An electric arc welding system as defined in claim 12 wherein said system includes more than two modules.

27. An electric arc welding system as defined in claim 6 wherein said system includes more than two modules.

28. An electric arc welding system as defined in claim 3 wherein said system includes more than two modules.

29. An electric arc welding system as defined in claim 2 wherein said system includes more than two modules.

30. An electric arc welding system as defined in claim 1 wherein said system includes more than two modules.

31. An electric arc welding system as defined in claim 30 wherein said controller includes a circuit to hold said welding current reduced for a set time after said first input to said controller.

32. An electric arc welding system as defined in claim 30 wherein said controller includes a circuit to hold said welding current reduced for a set time after said second input to said controller.

33. An electric arc welding system as defined in claim 30 wherein said waveform during said short circuit portion has a controlled rate of rise of said welding current.

34. An electric arc welding system as defined in claim 33 wherein said rate of rise is varied.

35. An electric arc welding system as defined in claim 24 wherein said controller includes a circuit to hold said welding current reduced for a set time after said first input to said controller.

36. An electric arc welding system as defined in claim 24 wherein said controller includes a circuit to hold said welding current reduced for a set time after said second input to said controller.

37. An electric arc welding system as defined in claim 24 wherein said waveform during said short circuit portion has a controlled rate of rise of said welding current.

38. An electric arc welding system as defined in claim 37 wherein said rate of rise is varied.

39. An electric arc welding system as defined in claim 12 wherein said controller includes a circuit to hold said welding current reduced for a set time after said first input to said controller.

40. An electric arc welding system as defined in claim 12 wherein said controller includes a circuit to hold said welding current reduced for a set time after said second input to said controller.

41. An electric arc welding system as defined in claim 12 wherein said waveform during said short circuit portion has a controlled rate of rise of said welding current.

42. An electric arc welding system as defined in claim 41 wherein said rate of rise is varied.

43. An electric arc welding system as defined in claim 6 wherein said controller includes a circuit to hold said welding current reduced for a set time after said first input to said controller.

44. An electric arc welding system as defined in claim 6 wherein said controller includes a circuit to hold said welding current reduced for a set time after said second input to said controller.

45. An electric arc welding system as defined in claim 6 wherein said waveform during said short circuit portion has a controlled rate of rise of said welding current.

46. An electric arc welding system as defined in claim 45 wherein said rate of rise is varied.

47. An electric arc welding system as defined in claim 1 wherein said controller includes a circuit to hold said welding current reduced for a set time after said first input to said controller.

48. An electric arc welding system as defined in claim 1 wherein said controller includes a circuit to hold said welding current reduced for a set time after said second input to said controller.

49. An electric arc welding system as defined in claim 1 wherein said waveform during said short circuit portion has a controlled rate of rise of said welding current.

50. An electric arc welding system as defined in claim 49 wherein said rate of rise is varied.

51. An electric arc welder as defined in claim 48 including a polarity switch to reverse the polarity of welding current at selected times.

52. An electric arc welder as defined in claim 47 including a polarity switch to reverse the polarity of welding current at selected times.

53. An electric arc welder as defined in claim 30 including a polarity switch to reverse the polarity of welding current at selected times.

54. An electric arc welder as defined in claim 24 including a polarity switch to reverse the polarity of welding current at selected times.

55. An electric arc welder as defined in claim 12 including a polarity switch to reverse the polarity of welding current at selected times.

56. An electric arc welder as defined in claim 6 including a polarity switch to reverse the polarity of welding current at selected times.

57. An electric arc welder as defined in claim 3 including a polarity switch to reverse the polarity of welding current at selected times.

58. An electric arc welder as defined in claim 2 including a polarity switch to reverse the polarity of welding current at selected times.

59. An electric arc welder as defined in claim 1 including a polarity switch to reverse the polarity of welding current at selected times.

\* \* \* \* \*